United States Patent
Al-Ahmari et al.

(10) Patent No.: US 10,065,242 B1
(45) Date of Patent: Sep. 4, 2018

(54) ADJUSTABLE BUILD ENVELOPE FOR POWDER BED FUSION MACHINES

(71) Applicant: KING SAUD UNIVERSITY, Riyadh (SA)

(72) Inventors: Abdulrahman M. Al-Ahmari, Riyadh (SA); Abdullah Yahia M. Alfaify, Riyadh (SA); Mohamed Hamid Hamid, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/909,933

(22) Filed: Mar. 1, 2018

(51) Int. Cl.
| | | |
|---|---|---|
| *B22F 3/105* | (2006.01) | |
| *B01J 8/18* | (2006.01) | |
| *B01J 8/38* | (2006.01) | |
| *B22F 3/11* | (2006.01) | |
| *B33Y 40/00* | (2015.01) | |
| *B33Y 30/00* | (2015.01) | |

(52) U.S. Cl.
CPC ........... *B22F 3/1055* (2013.01); *B01J 8/1872* (2013.01); *B01J 8/382* (2013.01); *B22F 3/1121* (2013.01); *B22F 2003/1056* (2013.01); *B33Y 30/00* (2014.12); *B33Y 40/00* (2014.12)

(58) Field of Classification Search
CPC ............................. B22F 3/1055; B01J 8/1872
See application file for complete search history.

(56) References Cited

U.S. PATENT DOCUMENTS

| | | | |
|---|---|---|---|
| 4,815,482 A | 3/1989 | Clift et al. | |
| 6,684,917 B2 | 2/2004 | Zhu et al. | |
| 9,149,870 B2 * | 10/2015 | Minick | B22F 3/1055 |
| 2004/0104149 A1 | 6/2004 | Lomas et al. | |
| 2007/0126157 A1 * | 6/2007 | Bredt | B33Y 40/00 |
| | | | 264/334 |
| 2011/0252618 A1 * | 10/2011 | Diekmann | B29C 67/0077 |
| | | | 29/401.1 |
| 2014/0302187 A1 * | 10/2014 | Pawlikowski | B29C 67/0085 |
| | | | 425/174.4 |
| 2016/0228991 A1 * | 8/2016 | Ryan | B23K 26/342 |

FOREIGN PATENT DOCUMENTS

| | | |
|---|---|---|
| DE | 19528577 A1 | 2/1997 |
| WO | 2017041931 A1 | 3/2017 |

\* cited by examiner

*Primary Examiner* — Alison L Hindenlang
*Assistant Examiner* — Nicholas R Krasnow
(74) *Attorney, Agent, or Firm* — Richard C. Litman

(57) ABSTRACT

The adjustable build envelope for powder bed fusion machines includes a frame in the build chamber having four movable sides, a base and two motors with lead screws. The motors are placed at an angle of 45° with respect to the side of the frame, so that as the motors rotate the lead screws, the two sides of the frame slide in opposite directions. The sides move inward with the help of guide pins and dovetail grooves, thereby reducing the build envelope volume. For large builds, both motors rotate in the reverse direction to increase the build envelope volume. By changing the build envelope volume according to the given build size, powder waste is reduced.

2 Claims, 3 Drawing Sheets

ADJUSTABLE BUILD ENVELOPE FOR POWDER BED FUSION MACHINES

BACKGROUND

1. Field

The disclosure of the present patent application relates to power bed fusion machines used in additive manufacturing, and particularly to an adjustable build envelope for powder bed fusion machines.

2. Description of the Related Art

The current powder bed fusion (PBF) systems use an energy source to fuse powders together that are contained in a top layer of a fixed build envelope. These energy sources include direct metal laser sintering, (DMLS); electron beam melting (EBM) selective laser sintering (SLS), or selective laser melting, (SLM). As the powders are fused, a bottom plate of the envelope is lowered and more powders are added on top of the fused layer. This continues layer by layer until the complete component(s) are formed. The fixed envelope is appropriate for uniform build sizes with large build platforms residing on a fixed volume of powder bed. In the case of smaller build sizes (x- and y-direction), the build envelope can utilize smaller build platforms, but the same fixed volume of powder bed is used. This causes an unnecessary amount of powder to get exposed, thereby reducing the useful life of the powder. In addition, fixed large envelopes require a large amount of powder, even for smaller builds, leading to high production cost due to the high prices of metal powder.

Thus, an adjustable build envelope for powder bed fusion machines solving the aforementioned problems is desired.

SUMMARY

The adjustable build envelope for powder bed fusion machines includes a frame in the build chamber having four movable sides, a base and two motors with lead screws. The motors are placed at an angle of 45° with respect to the side of the frame, so that as the motors rotate the lead screws, the two sides of the frame slide in opposite directions. The sides move inward with the help of guide pins and dovetail grooves, thereby reducing the build envelope volume. For large builds, both motors rotate in the reverse direction to increase the build envelope volume. By changing the build envelope volume according to the given build size, powder waste is reduced.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
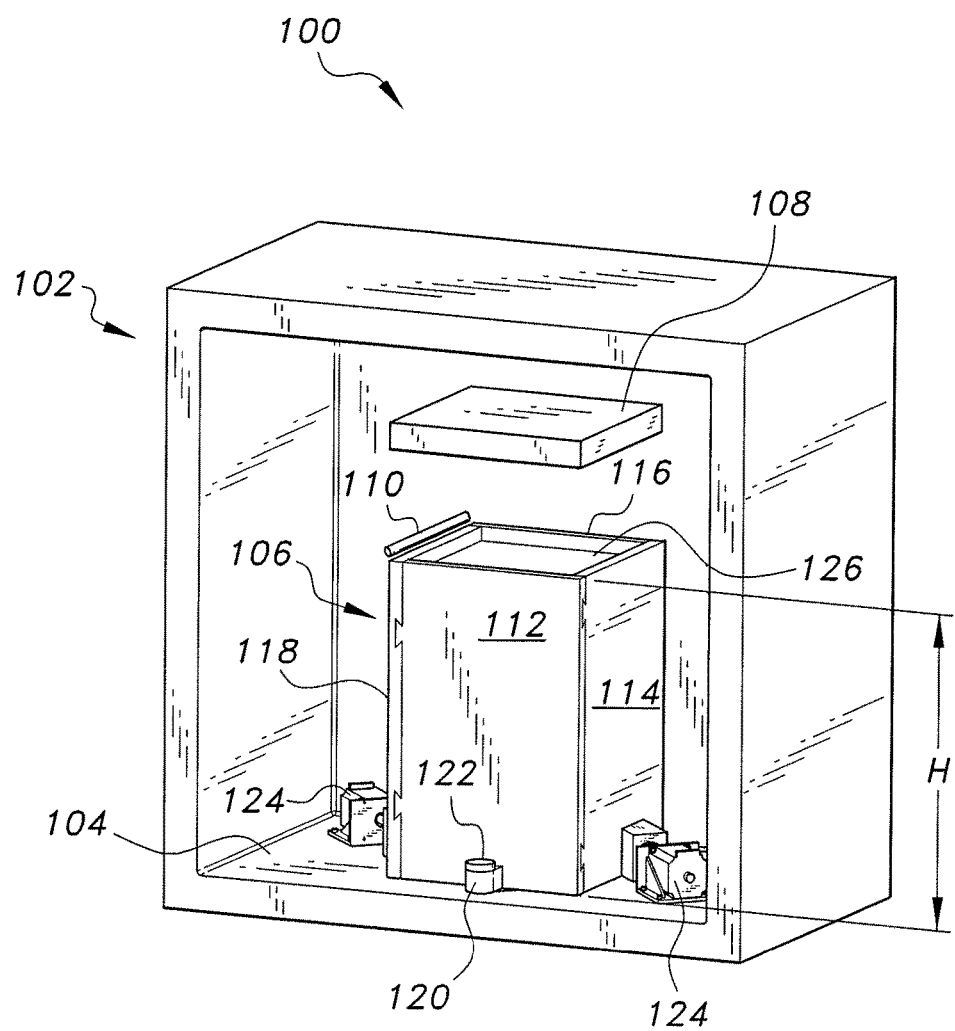
FIG. 1 is a perspective view of an exemplary build chamber of a powder bed fusion machine having an adjustable build envelope.
Figure 2:
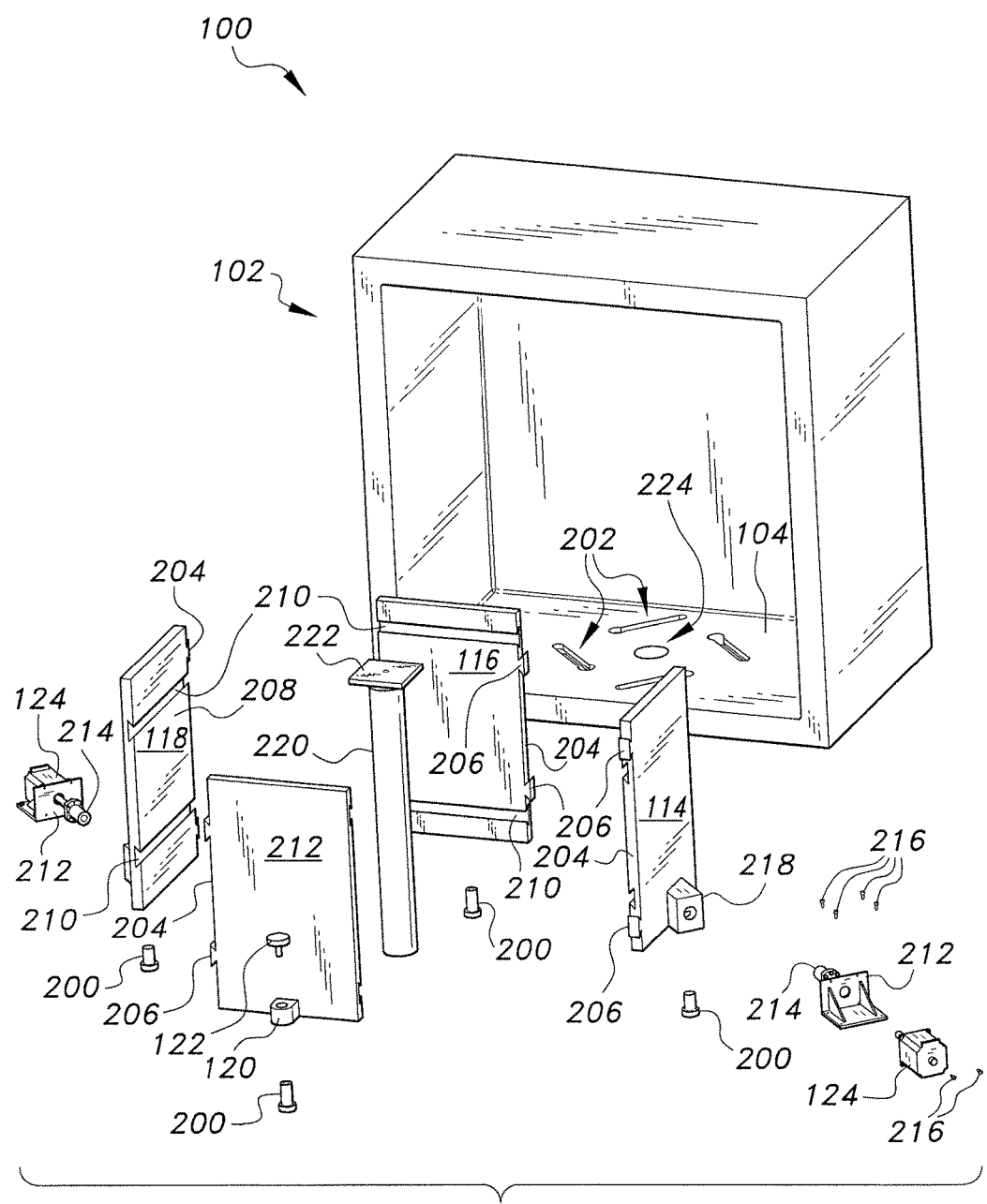
FIG. 2 is an exploded perspective view of the build chamber of FIG. 1.

FIGS. 1-2 show an exemplary build chamber 100 of a powder bed fusion machine having an adjustable build envelope. The chamber 100 is defined by a housing 102 including a base 104 and having a frame 106 defining an adjustable build envelope (the largest external dimensions of the x-, y-, and z-axes within the build space where parts can be fabricated) on the upper surface of the base 104. For any given build, the powder bed will be located within the frame 106. Above the frame 106 is an energy source 108 (FIG. 1), that provides energy required for fusing the powders in the top layer of the powder bed. A roller 110 (FIG. 1) is used to compact a new layer of powder, prior to fusion. The frame 106 includes four side walls 112, 114, 116 and 118. Each side wall 112, 114, 116 and 118 includes a guide pin bracket 120. Guide pins 200 extend through the guide pin brackets 120 and through guide slots 202 in the base 103. Guide pin caps 122 attach to the tops of the guide pins 200 to hold the guide pins 200 in place. One edge 204 of each frame side wall 112, 114, 116 and 118 includes two dovetail-shaped projections 206. The inside surface 208 of each frame side wall 112, 114, 116 and 118 includes two dovetail shaped grooves 210. The two dovetail-shaped projections 206 of each envelope side wall 112, 114, 116 and 118 extend into the two dovetail-shaped grooves 210 of the adjacent frame side. In this configuration, the dovetail-shaped projections 206 and the dovetail-shaped grooves 210 maintain the frame side walls 112, 114, 116 and 118 orthogonal to one another as they slide relative to each other, as described further below.

The housing 102 further encloses two drive motors 124 that are mounted to the base 104 using corresponding motor mounts 212 and appropriate fasteners 216. The drive motors 124 drive lead screws 214 within bushings 218 to advance or retract the side walls 112, 114, 116 and 118. As the side walls 112, 114, 116 and 118 are advanced or retracted, the guide pins 200 that extend through the guide pin brackets 120 and through guide slots 202 in the base 103, as well as the dovetail-shaped projections 206 and the dovetail-shaped grooves 210, maintain the frame side walls 112, 114, 116 and 118 orthogonal to one another, while simultaneously increasing or decreasing the volume of the adjustable build envelope defined by the frame 106, as is described further below. A bottom support post 220 (FIG. 2) supports a bottom plate 126 (FIG. 1) via a flat bracket 222 (FIG. 2). The bottom plate 126 (FIG. 1) that is used is the build platform, and is selected based on the adjusted size of the frame 106, as is described further below. The bottom support post 220 extends below the base 104 through orifice 224. The powder bed fusion machine further includes a bottom adjustment mechanism (not shown) below the base 104 for adjusting the height of the bottom plate 126 as additional powder levels are added.

Figure 3:
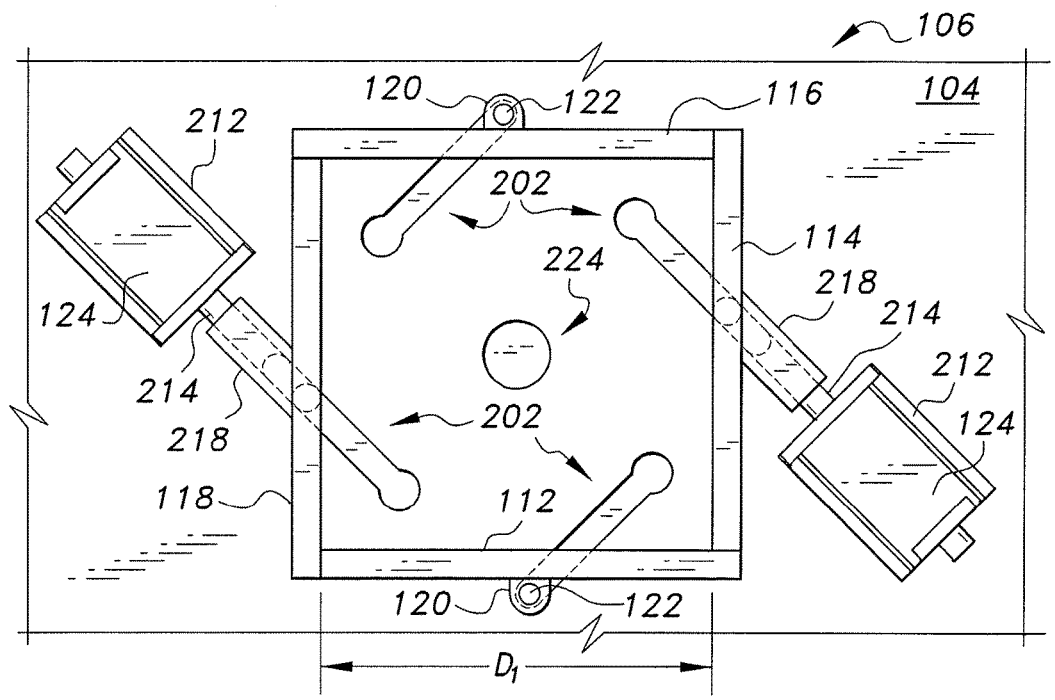
FIG. 3 is a diagrammatic top view of the adjustable build envelope of the machine of FIG. 1, showing the envelope in its largest configuration.

FIG. 3 shows a diagrammatic top view of the frame 106 of FIG. 1, showing the frame 106 in its largest configuration on the x- and y-axes. The top of the housing 102 and the bottom plate 126 have been removed to show the underlying features. In this configuration, the drive motors 124 have retracted the lead screws 214 within bushings 218 to retract the side walls 112, 114, 116 and 118 to their maximum volume position. In this position, each effective side of the adjustable powder bed envelope 106 is $D_1$ in length. Thus the effective volume of the adjustable frame 106 in FIG. 3 is its height H (FIG. 1) times the side length $D_1$ squared, or $HD_1^2$. After adjustment of the dimensions of the frame 106, the bottom plate 126 is placed on the post 220 and powder is loaded on the plate 126, with or without supports or molds, for fusion of the layers to fabricate the part.

Figure 4:
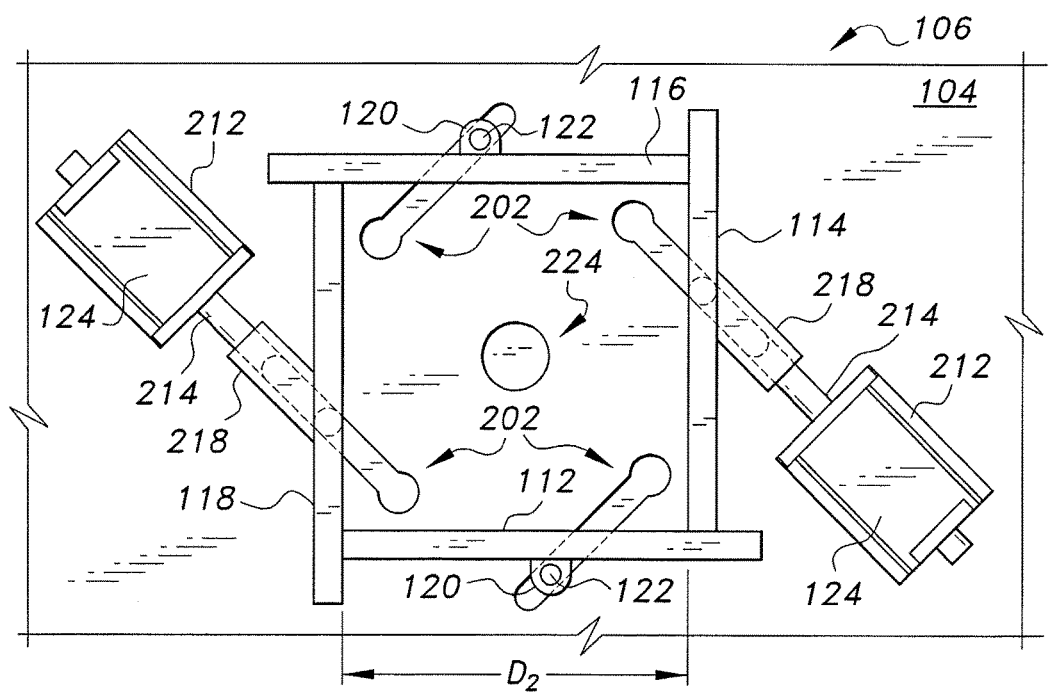
FIG. 4 is a diagrammatic top view of the adjustable build envelope of FIG. 3, showing the envelope in an intermediate configuration.

FIG. 4 shows a diagrammatic top view of the frame 106 of FIG. 1, showing the frame in an intermediate configuration, between the largest configuration of FIG. 3 and a minimum position (not shown). The top of the housing 102 and the bottom plate 126 have been removed to show the underlying features. In this configuration, the drive motors 124 have advanced the lead screws 214 within bushings 218 to advance the side walls 112, 114, 116 and 118 inward to an intermediate volume position. In this position, each effective side of the adjustable powder bed envelope 106 is $D_2$ in length, where $D_2$ is shorter in length than $D_1$. Thus, the effective volume of the adjustable build envelope defined by the frame 106 in FIG. 4 is the height H (FIG. 1) of the frame 106 times the side length $D_2$ squared, or $HD_2^2$. After adjustment of the dimensions of the frame 106, the bottom plate 126 is placed on the post 220 and powder is loaded on the plate 126, with or without supports or molds, for fusion of the layers to fabricate the part.

It is to be understood that the adjustable build envelope for powder bed fusion machines is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A powder bed fusion machine comprising:
    a build chamber; and
    an adjustable build envelope, comprising:
    a frame adapted for mounting in the build chamber, the frame having four side walls, each of the side walls having an inner face, and outer face, a top edge, a bottom edge, two opposing side edges, and upper and lower dovetail tongues projecting from one or the side edges, the inner face of each of the side walls having upper and lower dovetail grooves defined therein, the dovetail tongues of each of the sidewalls being slidably disposed in the dovetail groove of an adjacent one of the sidewalls defining dovetail joints interlocking the four sidewalls in a rectangular parallelepiped configuration defining the build envelope;
    a guide post bracket extending from the outer face of each of the sidewalls adjacent the bottom edge of the respective side wall, each of the brackets being adapted for receiving a guide post extending through the respective bracket and a corresponding guide slot defined in a floor of the build chamber;
    a bushing extending from the outer face of two of the side walls disposed parallel to each other, the bushings being mounted adjacent the bottom edge of the respective side walls;
    a pair of motor mounts adapted for mounting on the floor of the build chamber;
    a motor mounted on each of the motor mounts;
    a lead screw extending from each of the motors, each of the lead screw having a first end attached to the motor and a second end extending into a corresponding one of the bushings, the motors and the motor mounts being configured at an angle of 45° relative to the sidewall on which the corresponding bushing is mounted; the lead screws being extendable and retractable when the motors are operated in forward and reverse, respectively, whereby the dovetail tongues slide in the dovetail grooves so that the rectangular parallelepiped expands and contracts to adjust the build envelope, the side walls being constrained to maintain a rectangular parallelepiped configuration by the dovetail joints and sliding action of the guide posts in the guide slots in the floor of the build chamber.

2. The powder bed fusion machine according to claim 1, further comprising:
    a bottom support post disposed within the rectangular parallelepiped frame, the post being adapted for extending through the floor of the build chamber and being raised and lowered; and
    a bottom plate mounted on the post, the bottom plate defining a build platform for raising the powder bed.

* * * * *